(12) United States Patent
Wang et al.

(10) Patent No.: US 12,461,719 B2
(45) Date of Patent: *Nov. 4, 2025

(54) USER INTERFACE CONTROLS FOR VISUAL SOFTWARE MODIFICATION

(71) Applicant: Watershed Informatics, Inc., Cambridge, MA (US)

(72) Inventors: Alvin Wang, Cambridge, MA (US); Jonathan Wang, Cambridge, MA (US); Mark Kalinich, Cambridge, MA (US)

(73) Assignee: Watershed Informatics, Inc., Cambridge, MA (US)

( * ) Notice: Subject to any disclaimer, the term of this patent is extended or adjusted under 35 U.S.C. 154(b) by 59 days.

This patent is subject to a terminal disclaimer.

(21) Appl. No.: 18/319,124

(22) Filed: May 17, 2023

(65) Prior Publication Data

US 2023/0289148 A1    Sep. 14, 2023

Related U.S. Application Data

(63) Continuation-in-part of application No. 17/812,588, filed on Jul. 14, 2022, now Pat. No. 12,242,823.

(60) Provisional application No. 63/222,011, filed on Jul. 15, 2021.

(51) Int. Cl.
  *G06F 8/34* (2018.01)
  *G06F 8/41* (2018.01)
  *G06F 9/451* (2018.01)

(52) U.S. Cl.
  CPC .............. *G06F 8/34* (2013.01); *G06F 8/427* (2013.01); *G06F 9/451* (2018.02)

(58) Field of Classification Search
  CPC ..... G06F 8/34; G06F 8/38; G06F 8/20; G06F 8/427; G06F 9/451
  See application file for complete search history.

(56) References Cited

U.S. PATENT DOCUMENTS

| 7,316,003 | B1 | 1/2008 | Dulepet et al. |
| 11,003,308 | B1 * | 5/2021 | Dryer ......................... G06T 7/55 |
| 11,513,778 | B1 * | 11/2022 | Graves ....................... G06F 8/38 |

(Continued)

OTHER PUBLICATIONS

International Search Report and Written Opinion from International Application No. PCT/US2022/073786 dated Nov. 10, 2022, 16 pages.

*Primary Examiner* — Daniel Samwel
(74) *Attorney, Agent, or Firm* — Lando & Anastasi, LLP

(57) ABSTRACT

Techniques for visual software development are disclosed, including: (a) generating, by a visual code editor, (1) a data model of a plurality of code elements in a set of source code and (2) a kernel for execution of the set of source code; (b) based on a subset of the set of source code, the data model, and the kernel, generating an adjustable graphical user interface (GUI) form control; (c) presenting the adjustable GUI form control in alignment with the set of source code in a GUI of the visual code editor; and (d) responsive to user input in the GUI to adjust the adjustable GUI form control: (1) modifying the subset of source code and the data model according to the user input; (2) updating the presentation of the set of source code in the GUI to reflect the modified subset of source code; and (3) executing the modified set of source code, thereby updating variable values within the kernel.

21 Claims, 10 Drawing Sheets

```
human_genome                                   ,-402           406-,▷
hg19                                                               ⊙▾

⊚  # Import tools
   import watershed as ws            ,-404
   from helper import *
   %matplotlib widget

# Import the reference Genome
   human_genome = ws.Genome.from_identifier(ws.knob('hg19', ['hg19', 'hg38','mm10','sacCer']))

# Import metadata. (Note that FASTQ files were imported using our drag-and-drop import tool)
   seq_metadata = Metadata.from_identifier("demo_metadata")

# Create a custom metadata field
   seq_metadata['Patient_Treatment'] = seq_metadata['Treatment'] + '_' + seq_metadata['Patient']

# View metadata
   seq_metadata
```

(56) References Cited

U.S. PATENT DOCUMENTS

| | | | |
|---|---|---|---|
| 2007/0055966 A1* | 3/2007 | Waddington | G06F 8/31 |
| | | | 717/140 |
| 2009/0077091 A1* | 3/2009 | Khen | G06F 8/34 |
| 2009/0125877 A1* | 5/2009 | Kuzsma, Jr. | G06F 8/74 |
| | | | 717/105 |
| 2012/0324423 A1 | 12/2012 | Khan et al. | |
| 2013/0014093 A1 | 1/2013 | Lee | |
| 2013/0239087 A1 | 9/2013 | Fox et al. | |
| 2014/0047413 A1 | 2/2014 | Sheive et al. | |
| 2015/0347094 A1 | 12/2015 | Lattner et al. | |
| 2017/0123763 A1* | 5/2017 | Childs | G06F 8/33 |
| 2018/0024731 A1* | 1/2018 | Sanches | G06F 3/04817 |
| | | | 715/763 |
| 2018/0107478 A1* | 4/2018 | Codato | G06F 8/71 |
| 2019/0213102 A1 | 7/2019 | Raviv et al. | |
| 2019/0324728 A1 | 10/2019 | Evans et al. | |
| 2019/0369969 A1 | 12/2019 | Donohoe et al. | |
| 2022/0156062 A1* | 5/2022 | Kroth | G06F 9/541 |
| 2022/0317978 A1* | 10/2022 | Barik | G06F 8/34 |

\* cited by examiner

```
sequenceDiagram
    participant User
    participant UI/Editor
    participant Knobs
    participant Kernel rect rgb (245, 255, 245)
    Note over UI/Editor,Knobs: Initial render
    UI/Editor->>Knobs: Send code chunk
    Knobs->>Knobs: Find knob entrypoints
    Knobs->>Knobs: Parse entrypoints into python AST
    Knobs->>Knobs: Transform AST into knob model
    Knobs->>UI/Editor: Render knob model to HTML display
    end alt Knob.SELECT interaction
        User->> UI/Editor: Click on select knob
        UI/Editor->>Knobs: Render select dropdown
        Knobs->>Knobs: Check cache for variable value
        Knobs->>UI/Editor: Render cached value as options
        opt list length >=50
            UI/Editor->>UI/Editor: Render as windowed list for large lists
        end
        Knobs->>Kernel: Request variable introspection
        Kernal--)Knobs: Cast variable to list and send as response
        Knobs->>UI/Editor: Render new options
    end alt onChange
        User->> UI/Editor: Updates knob value
        UI/Editor->>Knobs: Notify of new value
        Knobs->>Knobs: Determine update location in text from model
        Knobs->>UI/Editor: Initiates text replacement
        Knobs->>UI/Editor: Create timers for fading text highlight
    end
```

FIG. 3

```
human_genome                                      ┌402                    406 ◁▷
┌─────────────────────────────────────────────────────────────────────────────┐
│ hg19                                                                    ⊛▼ │
└─────────────────────────────────────────────────────────────────────────────┘
┌─────────────────────────────────────────────────────────────────────────────┐
│ # Import tools                                                              │
│ import watershed as ws                          ┌404                        │
│ from helper import *                                                        │
│ %matplotlib widget                                                          │
│                                                                             │
│ # import the reference Genome                                               │
│ human_genome = ws.Genome.from_identifier(ws.knob('hg19', ['hg19','hg38','mm10','sacCer']))│
│                                                                             │
│ # Import metadata. (Note that FASTQ files were imported using our drag-and-drop import tool)│
│ seq_metadata = Metadata.from_identifier("demo_metadata")                    │
│                                                                             │
│ # Create a custom metadata field                                            │
│ seq_metadata['Patient_Treatment'] = seq_metadata['Treatment'] + '_' + seq_metadata['Patient']│
│                                                                             │
│ # View metadata                                                             │
│ seq_metadata                                                                │
└─────────────────────────────────────────────────────────────────────────────┘
                                 FIG.4A
```

```
first_var               ┌412(a)      second_var               ┌412(b)  406◁▷
┌──────────────────────────────────┐ ┌──────────────────────────────────┐
│ Patient                      ⊛▼  │ │ Treatment                    ⊛▼  │
└──────────────────────────────────┘ └──────────────────────────────────┘
┌─────────────────────────────────────────────────────────────────────────────┐
│ first_var = ws.knob('Patient',seq_metadata.columns)        ┌404             │
│ second_var = ws.knob('Treatment',seq_metadata.columns)                      │
│ ws.Sequence.plot_pca(counts, seq_metadata[[first_var, second_var]], title=f'PCA of {first_var} and {second_var}')│
│ #Note: The second variable is shape, and only can have 6 different variables!│
└─────────────────────────────────────────────────────────────────────────────┘
                                 FIG.4B
``` genes  ⎡422                                                                                        406⟶
[APOC1 ×][GPHA2 ×][POLR3G ×][ESR1 ▪]

```
genes = ws.knob(['APOC1','GPHA2','POLR3G','ESR1'], ['TREM1','ACP5','APOC1','GPHA2','POLR3G','BRAF','CD36'],{"creatable": True, "multi": True})
labeled_counts = Metadata.relabel(counts, seq_metadata, 'ID')
ws.Sequence.plot_heatmap(labeled_counts, gene_list=genes, z_score=False)
```
⎣404

FIG.4C mito_percent        ⎡432(a)              Minimum and Maximum Genes per Cell   ⎡432(b)  406⟶
○————●————————————1              ○———————————●—————6000

```
#Pick your cutoffs based on the above graphs
mito_percent = ws.knob(0.19,{'min': 0, 'max': 1, 'step': 0.01})
min_gene, max_gene = ws.knob([200,4000],{'min': 0, 'max': 6000, 'step':100, 'label': 'Minimum and Maximum Genes per Cell'})
```
⎣404

FIG.4D

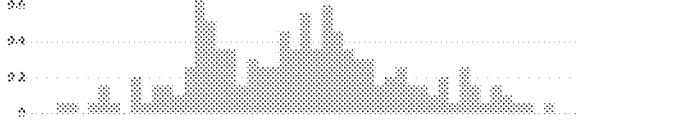

USER INTERFACE CONTROLS FOR VISUAL SOFTWARE MODIFICATION

RELATED APPLICATIONS

This application claims priority to U.S. patent application Ser. No. 17/812,588, filed on Jul. 14, 2022 and Provisional Patent Application No. 63/222,011, filed on Jul. 15, 2021, the entire contents and teachings of both of which are hereby incorporated herein by this reference.

BACKGROUND

Typically, software development requires considerable knowledge of computer programming, including code syntax, data structures, library calls, etc. The need for such knowledge presents a significant hurdle for those who seek to develop software but lack sufficient training and experience in computer programming.

Approaches described in this section have not necessarily been conceived and/or pursued prior to the filing of this application. Accordingly, unless otherwise indicated, approaches described in this section should not be construed as prior art.

TECHNICAL FIELD

The present disclosure relates generally to visual software development.

SUMMARY

In general, in one aspect, one or more non-transitory computer-readable media store instructions that, when executed by one or more processors, cause the one or more processors to perform operations including: (a) generating, by a visual code editor, (1) a data model of a plurality of code elements in a set of source code and (2) a kernel for execution of the set of source code; (b) based on a subset of the set of source code, the data model, and the kernel, generating an adjustable graphical user interface (GUI) form control; (c) presenting the adjustable GUI form control in alignment with the set of source code in a GUI of the visual code editor; and (d) responsive to user input in the GUI to adjust the adjustable GUI form control: (1) modifying the subset of source code and the data model according to the user input; (2) updating the presentation of the set of source code in the GUI to reflect the modified subset of source code; and (3) executing the modified set of source code, thereby updating variable values within the kernel.

Generating the data model of the multiple code elements may include parsing the set of source code into an abstract syntax tree (AST), multiple nodes of the AST corresponding to respective code elements in the multiple code elements. The GUI may include a web page, the adjustable GUI form control may be a hypertext markup language (HTML) form control, and generating the adjustable GUI form control may be performed by an application running within a browser configured to render the webpage.

The operations may further include: while presenting the adjustable GUI form control in the GUI of the visual code editor, detecting a change in the subset of code associated with the first adjustable GUI form control; and adjusting the first adjustable GUI form control according to the change in the subset of source code.

The operations may further include: (e) based on another subset of the set of source code, the data model, and the kernel, generating another adjustable GUI form control, including: (1) requesting variable introspection from the kernel with reference to the data model; and (2) in response to obtaining updated variable values from the kernel, updating the data model and using the updated variable values in the other adjustable GUI form control; (f) presenting the other adjustable GUI form control in alignment with the set of source code in the GUI of the visual code editor; and (g) responsive to additional user input in the GUI to adjust the other adjustable GUI form control: (1) modifying the other subset of source code and the data model according to the additional user input; (2) updating the presentation of the set of source code in the GUI to reflect the modified other subset of source code; and (3) executing the modified set of source code, thereby updating variable values within the kernel. The operations may further include, responsive to the user input in the GUI to adjust the adjustable GUI form control, setting a flag indicating that the data model has been updated. Requesting variable introspection from the kernel as part of generating the other adjustable GUI form control may be performed in response to detecting that the flag indicates that the data model has been updated. Presenting the adjustable GUI form control and the other adjustable GUI form control in alignment with the set of source code in the GUI of the visual code editor may include displaying the adjustable GUI form control and the other adjustable GUI form control interleaved with the set of source code in the GUI, the adjustable GUI form control being displayed with the subset of the source code and the other adjustable GUI form control being displayed with the other subset of the source code.

Generating the adjustable GUI form control may include: (1) requesting variable introspection from the kernel with reference to the data model; and (2) in response to obtaining updated variable values from the kernel, updating the data model and using the updated variable values in the adjustable GUI form control.

Presenting the adjustable GUI form control in alignment with the set of source code in the GUI of the visual code editor may include displaying the adjustable GUI form control and another adjustable GUI form control interleaved with the set of source code in the GUI, the adjustable GUI form control being displayed with the subset of the source code and the other adjustable GUI form control being displayed with another subset of the source code.

Presenting the adjustable GUI form control in alignment with the set of source code in the GUI of the visual code editor may include displaying the adjustable GUI form control and another adjustable GUI form control horizontally adjacent to each other in the GUI, the adjustable GUI form control and the other adjustable GUI form control both being displayed vertically adjacent to the subset of the source code.

Presenting the adjustable GUI form control in alignment with the set of source code in the GUI of the visual code editor may include displaying the adjustable GUI form control vertically adjacent to the subset of the source code.

Updating the presentation of the set of source code in the GUI to reflect the modified subset of source code may include displaying the subset of source code in the GUI with the modifications highlighted. Updating the presentation of the set of source code in the GUI to reflect the modified subset of source code may further include fading out the highlighting a predetermined amount of time after displaying the subset of source code in the GUI with the modifications highlighted.

The operations may further include: executing the modified set of source code in response to selection of a code execution element in the GUI.

In general, in one aspect, a system includes at least one device including a hardware processor. The system is configured to perform operations including: (a) generating, by a visual code editor, (1) a data model of a plurality of code elements in a set of source code and (2) a kernel for execution of the set of source code; (b) based on a subset of the set of source code, the data model, and the kernel, generating an adjustable graphical user interface (GUI) form control; (c) presenting the adjustable GUI form control in alignment with the set of source code in a GUI of the visual code editor; and (d) responsive to user input in the GUI to adjust the adjustable GUI form control: (1) modifying the subset of source code and the data model according to the user input; (2) updating the presentation of the set of source code in the GUI to reflect the modified subset of source code; and (3) executing the modified set of source code, thereby updating variable values within the kernel.

In general, in one aspect, a method includes: (a) generating, by a visual code editor, (1) a data model of a plurality of code elements in a set of source code and (2) a kernel for execution of the set of source code; (b) based on a subset of the set of source code, the data model, and the kernel, generating an adjustable graphical user interface (GUI) form control; (c) presenting the adjustable GUI form control in alignment with the set of source code in a GUI of the visual code editor; and (d) responsive to user input in the GUI to adjust the adjustable GUI form control: (1) modifying the subset of source code and the data model according to the user input; (2) updating the presentation of the set of source code in the GUI to reflect the modified subset of source code; and (3) executing the modified set of source code, thereby updating variable values within the kernel.

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures:

FIG. 3 illustrates an example of operations for visual software development according to an embodiment;

FIGS. 4A-4I illustrate examples of visual software development according to an embodiment.

DETAILED DESCRIPTION

A. Introduction

One or more embodiments described herein include a code editor extension that facilitates software development by non-programmers. As described herein, techniques for visual software development include transforming code literals into interactive user interface elements, referred to herein as adjustable graphical user interface (GUI) controls or "knobs." Knobs and associated source code may be respectively bound to each other (two-way binding), so that adjusting a knob causes a corresponding modification to the source code, and modifying the source code causes a corresponding change in the knob's appearance. Thus, techniques described herein provide an intuitive interface for novice programmers to modify code, without requiring sophisticated knowledge of code syntax, data structures, library calls, etc. In addition, by rendering configurable code chunks as knobs, those chunks—and the ability to configure them—are made more salient to the user. Because the source code does not need to be compiled first to generate and render a knob as described herein, that saliency is provided when it is most helpful, i.e., before compiling and executing the code.

When rendered in a user interface, knobs generated using techniques described herein are easy for the user to understand, while being flexible enough to apply to many different kinds of code. For example, identifying knob entry points (as described in further detail below) may be done without requiring code refactoring and without requiring the code associated with knobs to be isolated from other parts of the code, so that techniques described herein can be applied to existing source code. Accordingly, techniques described herein may be applied to many different kinds of software development, in order to help simplify software development in many different fields. Moreover, the state of a knob may be serializable and preserved between sessions, thus further easing the software development process by avoiding the need to reconfigure knobs each session (and associated risk of failing to correctly reproduce a prior configuration).

B. System Architecture

Figure 1:
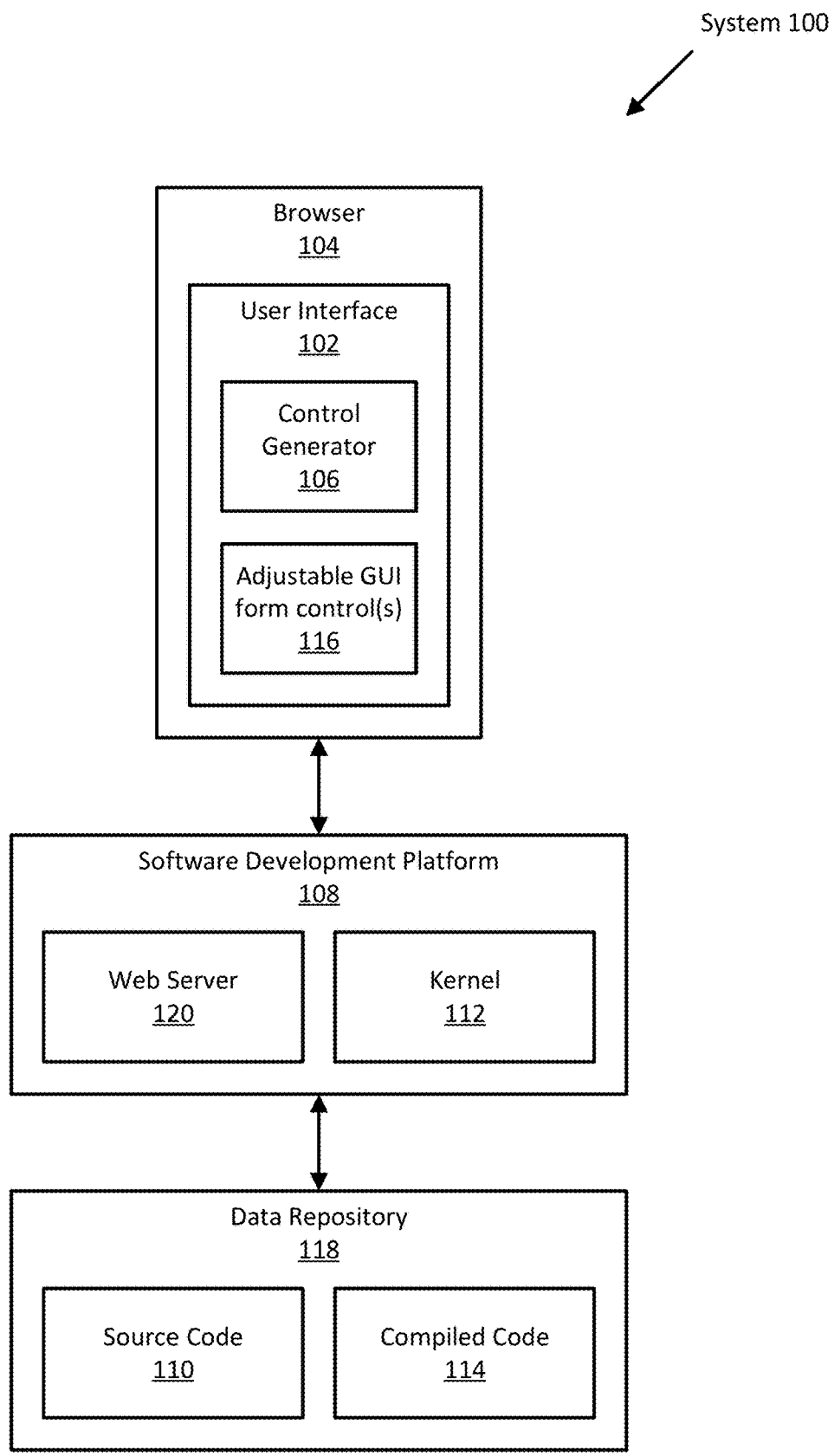
FIG. 1 is a block diagram of an example of a system according to an embodiment.

FIG. 1 is a block diagram of an example of a system 100 according to an embodiment. In an embodiment, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

As illustrated in FIG. 1, the system 100 includes a software development platform 108. A software development platform 108 refers to a set of hardware and/or software, including tools for developing software. Specifically, the software development platform 108 includes tools for generating source code 110 to perform one or more functions. The software development platform 108 may further include a compiler (not depicted) configured to compile the source code 110 into compiled code 114. The software development platform 108 includes a kernel 112 that serves as a run-time environment for execution of the source code 110. The software development platform 108 may be a web-based platform, providing software development tools using a software-as-a-service (SaaS) model. Alternatively or additionally, the software development platform 108 may include an application that is installable and executable directly on a user's device(s).

The system 100 further includes a user interface 102. In general, a user interface 102 refers to hardware and/or software configured to facilitate communications between a user and the software development platform 108. A user interface 102 renders user interface elements and receives input via user interface elements. A user interface 102 may be a graphical user interface (GUI), a command line interface (CLI), a haptic interface, a voice command interface, and/or any other kind of interface or combination thereof. Examples of user interface elements include checkboxes, radio buttons, dropdown lists, list boxes, buttons, toggles, text fields, date and time selectors, command lines, sliders, pages, and forms. Different components of a user interface 102 may be specified in different languages. The behavior of user interface elements may be specified in a dynamic programming language, such as JavaScript. The content of user interface elements may be specified in a markup language, such as hypertext markup language (HTML), Extensible Markup Language (XML), or XML User Interface Language (XUL). The layout of user interface elements may be specified in a style sheet language, such as Cascading Style Sheets (CSS). Alternatively or additionally, aspects of a user interface 102 may be specified in one or more other languages, such as Java, Python, Perl, C, C++, and/or any other language or combination thereof. In an embodiment, the user interface 102 includes HTML rendered in a browser 104 executing on a user's device. The software development platform 108 may include a web server 120 configured to serve web pages to the browser 104 over a network (e.g., the Internet) (not shown).

In an embodiment, the user interface 102 includes a control generator 106. A control generator 106 refers to a set of hardware and/or software configured to perform operations described herein for generating one or more adjustable GUI form controls 116 to be included in the user interface 102. For example, the control generator 106 may include client-side scripting configured to perform one or more operations described herein for generating an adjustable GUI form control 116. Alternatively or additionally, the software development platform 108 may be configured to perform one or more operations described herein for generating one or more adjustable GUI form controls 116. Control generator 106 may be configured to perform a parsing operation to search for keywords or regular expressions associated with knob entry points that define the GUI form controls 116. Control generator 106 may operate independently from the kernel 112 and outside the kernel 112 environment.

As described in further detail herein by way of various examples, an adjustable GUI form control 116 is a GUI control (e.g., including one or more checkboxes, radio buttons, dropdown lists, list boxes, buttons, toggles, text fields, date and time selectors, command lines, sliders, pages, and/or forms, etc.) that a user can adjust to modify the source code 110. If the user interface 102 is a web page, an adjustable GUI form control 116 may be implemented as a custom control, for example, using CSS and/or JavaScript. An adjustable GUI form control 116 may also be adjustable by modifications directly to the source code 110. A change to a segment of the source code 110 may trigger a sequence of operations that causes a corresponding visual adjustment to the adjustable GUI form control 116 associated with that segment of the source code 110. For ease of discussion, adjustable GUI form controls 116 are also referred to herein as "knobs." However, the term "knob" should not be construed as limiting an adjustable GUI form control 116 to knoblike appearance and/or functionality.

In an embodiment, the system 100 includes a data repository 118. A data repository 118 is any type of storage unit and/or device (e.g., a file system, database, collection of tables, or any other storage mechanism) for storing data. A data repository 118 may include multiple different storage units and/or devices. The multiple different storage units and/or devices may or may not be of the same type or located at the same physical site. Further, a data repository 118 may be implemented or may execute on the same computing system as one or more other components of the system 100. Alternatively or additionally, a data repository 118 may be implemented or executed on a computing system separate from one or more other components of the system 100. A data repository 118 may be logically integrated with one or more other components of the system 100. Alternatively or additionally, a data repository 118 may be communicatively coupled to one or more other components of the system 100 via a direct connection or via a network. In FIG. 1, a data repository 118 is illustrated as storing various kinds of information. Some or all of this information may be implemented and/or distributed across any of the components of the system 100. However, this information is illustrated within the data repository 118 for purposes of clarity and explanation.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

C. Example Operations for Visual Software Development

Figure 2:
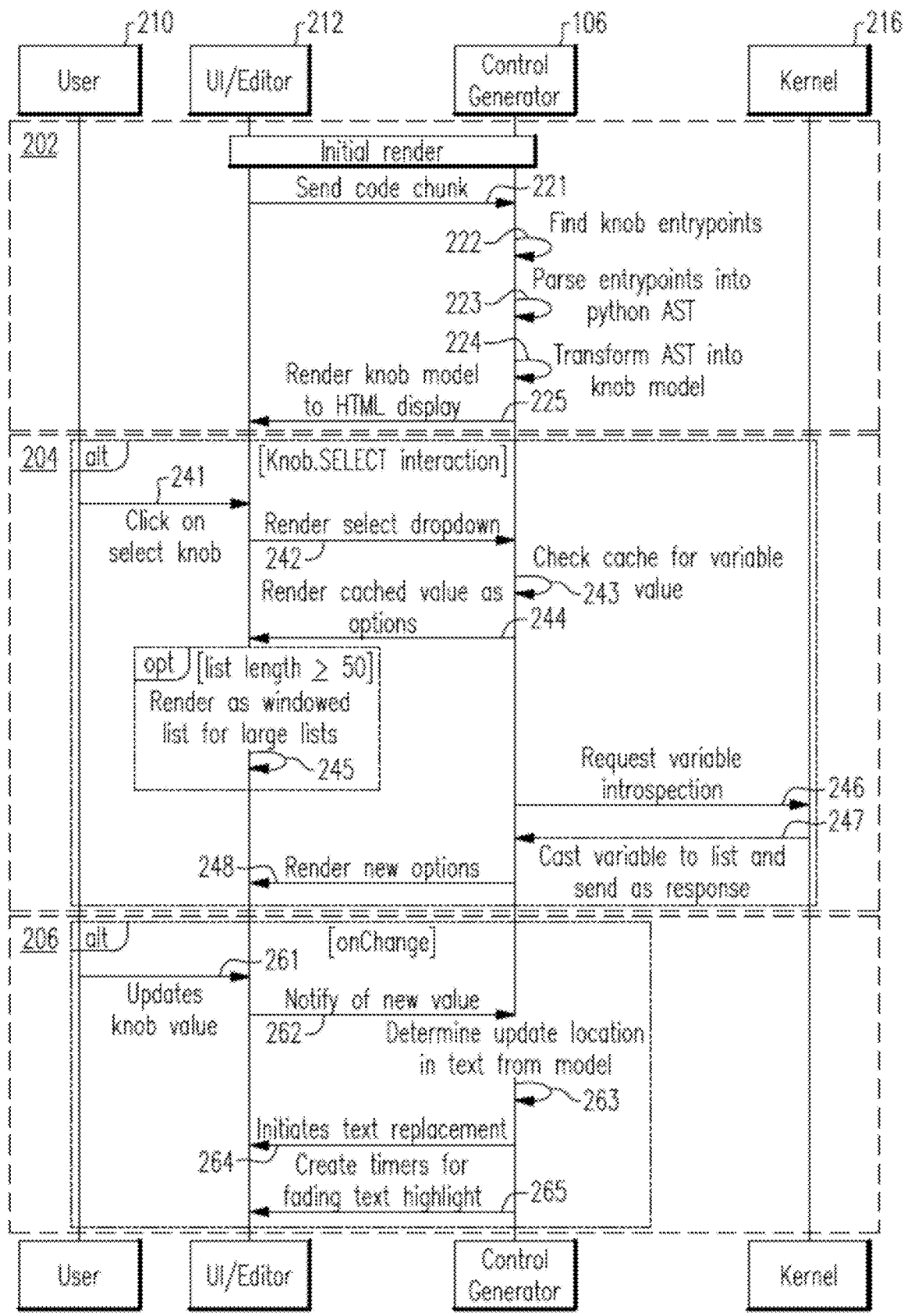
FIG. 2 is a sequence diagram of an example of operations for visual software development according to an embodiment.

FIG. 2 is a sequence diagram of an example of operations for visual software development according to an embodiment. One or more operations illustrated in FIG. 2 may be modified, rearranged, or omitted all together. Accordingly, the particular sequence of operations illustrated in FIG. 2 should not be construed as limiting the scope of one or more embodiments.

In the example illustrated in FIG. 2, the system 100 includes a graphical user interface (GUI) for visual software development ("UI/editor") 212. The UI/Editor 212 is configured to receive input from a user 210 and render GUI elements including one or more "knobs" (i.e., adjustable GUI form controls 116). Generating knobs may be performed, at least in part, by a client-side control generator 106 as illustrated in FIG. 1. The control generator 106 may also be configured to communicate with a client-side or server-side kernel 112, to obtain information used to generate knobs.

In some embodiments, UI/editor 212 may be implemented as a programming notebook, such as, for example, a Jupyter notebook. The Jupyter notebook may be displayed within user interface 102 as a set of source code 110 interleaved with one or more knobs 116 and/or programmatic output. The source code 110 may be executed by a Jupyter kernel 112 (e.g., interpreting Python) serving as a run-time environment for execution of the source code 110 while maintaining variables within memory used by the source code 110. The programming notebook may be implemented as an executable program (e.g., a Javascript app) running on the user's device (e.g., within browser 104).

As illustrated in FIG. 2, during an initial render of the GUI (block 202), the UI/Editor 212 sends (step 221) a code chunk (i.e., a set of one or more lines of logically-related code, such as a method, class, etc.) to the control generator 106. The control generator 106 inspects (step 222) the code chunk to identify one or more knob entry points. A knob entry point is a location (e.g., one or more lines of code, which may include all of the code chunk or a portion thereof) that the control generator 106 recognizes as capable of being represented using an adjustable GUI form control 116. The control generator 106 may support multiple kinds of adjustable GUI form controls 116, and may be configured to identify entry points corresponding to each kind of supported control. Identifying a knob entry point may include identifying code that matches a particular syntax. Identifying a knob entry point may not require code refactoring, and may not require the code associated with knobs to be isolated from other parts of the code For each knob entry point that the control generator 106 identifies, the control generator 106 parses (step 223) the entry point into its component code elements. In this example, the code is in Python and the control generator 106 parses entry points into a Python abstract syntax tree (AST). The control generator 106 then transforms (step 224) the AST (or some other representation of the entry point's component code elements) into a knob model. The knob model includes information used to render the knob. For example, the knob model may include one or more of: the AST; a reference to the knob entry point (e.g., as a start index that indicates the entry point's position in the entire code chunk); a name assigned to the knob (which may be an inferred or assumed name, derived from a variable and/or named parameter assignment detected in the AST); and/or a knob type. A knob type indicates a type of GUI control to generate (e.g., select, number, slider, text, switch, etc.). In an embodiment, it is not necessary to explicitly specify a knob type; the knob type may be inferred from one or more of: inspecting number nodes in the balanced knob AST expression; syntax types of nodes in the AST; and/or values of particular nodes. Alternatively, a knob type may be explicitly provided (for example, based on a user preference). The control generator 106 renders (step 225) the knob model to the UI/Editor's display (e.g., a web page) as a knob, i.e., adjustable GUI form control 116.

In an embodiment, the specific values that are available for a given knob are not rendered immediately in the UI/Editor 212. In the example illustrated in FIG. 2, the knob is rendered as an HTML "select" tag, i.e., a dropdown menu). When a user 210 clicks, taps, or otherwise activates the knob (step 241), the UI/Editor 212 begins the process of rendering (step 242) the dropdown menu (block 204). The control generator 106 checks (step 243) its cache for the underlying variable's value. In this example, the value is a list (implemented, for example, as an array or other data structure) of possible values for the dropdown. The UI/Editor 212 renders (step 244) the value (in this example, the elements of the list) as options in the dropdown menu. In some embodiments, the UI/Editor 212 may use different kinds of display options for the controls depending on the value returned. For example, if the value is a list having more than a predetermined threshold length (e.g., 50 or more elements), the UI/Editor 212 may render the select knob dropdown as a windowed list (step 245).

In some embodiments, if the variable's value is not cached, the cache is expired, or the control generator 106 determines (e.g., based on a system flag) that a new value is available, the control generator 106 may request (step 246) variable introspection by the kernel 112. In other embodiments, this variable introspection may be performed regardless of the cache or flag state. The kernel 112 returns the value to the control generator 106. If the value is not of a type supported by the control generator 106, the kernel 112 may cast the value to a supported type. For example, the kernel 112 may cast (step 247) the value to a list. The control generator 106 may then provide the newly retrieved options to the UI/Editor 212 for rendering as a knob (step 248).

In an embodiment, the system 100 is configured to modify the source code 110 responsive to user input that adjusts a knob (block 206). When the user 210 updates (step 261) a knob value (in this example, by selecting an option in a dropdown menu), the UI/Editor 212 notifies (step 262) the control generator 106 of the new value. The control generator 106 determines (step 263) which portion of the source code 110 (i.e., the text of the code) corresponds to the adjusted value. To determine the corresponding portion of code, the control generator 106 may reference the knob model that was generated from the code syntax and used to render the knob. As discussed above, the knob model may be linked to the code it modifies by a reference (e.g., a start index) in the model, which allows the control generator 106 to initiate text replacement (step 264) at the appropriate location as the model changes responsive to user input. If the text of the source code is also displayed in the UI/Editor 212, then the adjusted text is also rendered in the UI/Editor 212. Rendering the adjusted text may also include rendering one or more visual cues indicating which text was adjusted. For example, the adjusted text may be rendered as highlighted, and a timer (step 265) may determine when to fade out the highlighting (e.g., in a predetermined number of seconds after rendering the adjusted text in the UI/Editor 212).

In an embodiment, when the text of the source code 110 itself is manually edited (not shown in FIG. 2), the control generator 106 may reference the knob model to determine which knob(s) is/are associated with the edited code. The control generator 106 may instruct the UI/Editor 212 to modify rendering of the corresponding knob(s) to reflect the code edit(s).

When a user 210 selects a knob (block 204), the system 100 performs a set of operations to determine and render the options for values of that knob. In this example, the knob is rendered as a list; similar operations may be performed for other kinds of adjustable GUI form controls 116.

As noted above, knob state may be serializable (not shown in FIG. 2). The system may serialize a knob state and store the serialized state in some form of storage (e.g., data repository 118) that persists between sessions. In a subsequent session, the system 100 may retrieve the serialized state so that the state is preserved and the knob does not need to be reconfigured.

FIG. 3 illustrates an example of operations for visual software development according to an embodiment. Specifically, FIG. 3 illustrates pseudocode of operations for visual software development according to an embodiment, implemented in this example as uniform markup language (UML) markup corresponding to the sequence diagram of FIG. 2. One or more operations illustrated in FIG. 3 may be modified, rearranged, or omitted all together. Accordingly, the particular sequence of operations illustrated in FIG. 3 should not be construed as limiting the scope of one or more embodiments.

D. Example Adjustable Gui Form Controls

FIGS. 4A-4I illustrate examples of adjustable GUI form controls 116 ("knobs") according to an embodiment. These examples are provided for purposes of clarity. Components and/or operations described below should be understood as examples that may not be applicable to one or more embodiments. Accordingly, components and/or operations described below should not be construed as limiting the scope of one or more embodiments. In the examples illustrated in FIGS. 4A-4D, knobs are generated for development of bioinformatics software. Similar concepts may be applied to other kinds of software development.

FIG. 4A illustrates an example of a knob 402 that allows a user 210 to select a single value from a list. Specifically, in this example, the user 210 can select a particular reference genome to work with. The values in the knob's dropdown list are the list of available genomes (hg19, hg38, mm10, and sacCer), and the genome hg19 is currently selected. Based on the user's selection, the UI/Editor 212 modifies the source code 404 to import the selected genome along with the necessary tools and metadata to work with the genome. Subsequently, when the user 210 selects a code execution element 406, the kernel 112 executes source code 404, as modified.

FIG. 4B illustrates an example of knobs 412(a), 412(b) that allow a user 210 to make two selections. Specifically, in this example, the user 210 can make selections for principal component analysis.

FIG. 4C illustrates a knob 422 that allows the user 210 to provide free-text entries. Specifically, in this example, the creatable/free-text option allows the user 210 to supply one or more entries (e.g., "ESR1") that is/are not provided in the selectable list.

FIG. 4D illustrates an example of knobs 432(a), 432(b) including continuous variable selectors. Specifically, in this example, the user 210 can adjust the sliders to filter the data by mitochondrial percentage and number of genes. Again, adjusting a slider triggers a corresponding change in the underlying source code 404, to apply the appropriate filter(s).

Figure 4F:
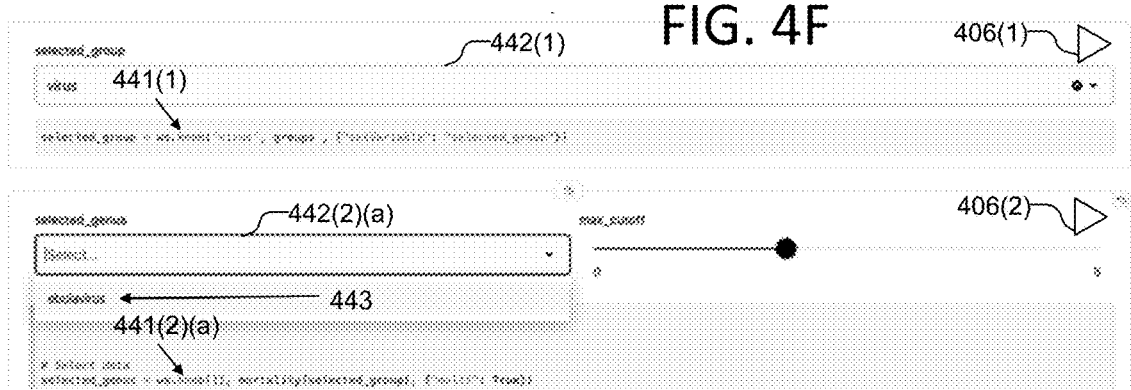

FIG. 4E illustrates three example chunks of source code 404 (depicted as source code chunks 404(0), 404(1), 404(2)) interleaved with several knobs 442 (depicted as knobs 442(1), 442(2)(a), 442(2)(b)). Initial code chunk 404(0) includes various definitions, but no knob entry points 441. Code chunk 404(1) includes one knob entry point 441(1) (defined by the single reference to the "ws.knob" function) that causes control generator 106 to generate knob 442(1). Specifically, in this example, the user 210 can select "bacterium," "virus," or "amoeba." Because the knob entry point 441(1) is defined using a variable (i.e., the variable "groups"), control generator 106 may generate knob 442(1) by asking the kernel 112 to perform variable introspection on the "groups" variable (although, in some embodiments, this step may be omitted if the value was already cached and unchanged). With reference to code chunk 404(0), "groups" was originally defined as a list including "bacterium" and "virus," and it was later updated to also include "amoeba." As depicted in FIG. 4E, the user 210 has selected the "virus" option. Code chunk 404(2) includes two knob entry points 441(2)(a), 441(2)(b) (defined by the two references to the "ws.knob" function) that causes control generator 106 to generate knobs 442(2)(a), 442(2)(b). Specifically, in this example, knob entry point 441(2)(a) is defined with reference to the "selected_group" variable (which is defined by the user's selection in knob 442(1)) and the mortality dictionary that was defined in code chunk 404(0). Since the user 210 has selected "virus" in knob 442(1), the only possible choice presented in dropdown menu 442(2)(a) is "ebolavirus." Because the knob entry point 441(2)(a) is defined using a variable (i.e., the variable "selected_group"), control generator 106 may generate knob 442(2)(a) by asking the kernel 112 to perform variable introspection on the "selected_group" variable. FIG. 4F illustrates an example of knob 442(2)(a) while expanded after the user 210 has selected it. As depicted in FIG. 4F, expanded knob 442(2)(a) displays list 443 having the single option "ebolavirus." After the user 210 selects "ebolavirus," knob entry point 441(2)(a) is updated to note that selection. Returning to FIG. 4E, knob entry point 441(2)(b) is defined with reference to literal values 0 (minimum), 5 (maximum), and 0.1 (step), so variable introspection is not used. Knob 442(2)(a) is a slider that allows the user 210 to select any value (with a step of 0.1) from 0 through 5 as a maximum cutoff value. As depicted in FIG. 4E, the user 210 has selected a maximum cutoff value of 2.4. When the user 210 selects execution element 406(2), code chunk 404(2) (as modified by the user's selections from knobs 442(2)) executes to generate an output graph 408 (displayed aligned with and after code chunk 404(2). In the example of FIG. 4E, output graph 408 depicts binned mortality values for ebolavirus with values within the range of −2.4 through 2.4.

Figure 4G:
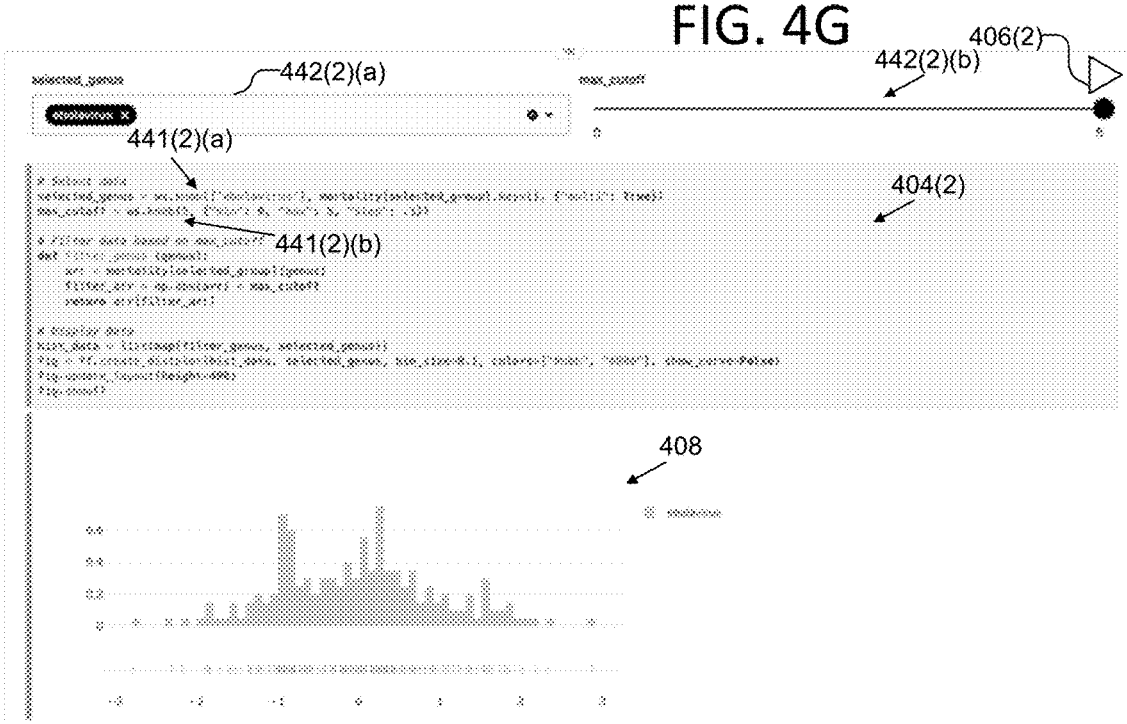

FIG. 4G depicts a situation in which the user 210 has selected a maximum cutoff value of 5. When the user 210 selects execution element 406(2), code chunk 404(2) (as modified by the user's selections from knobs 442(2)) executes to generate an output graph 408 (displayed aligned with and after code chunk 404(2). In the example of FIG. 4G, output graph 408 depicts binned mortality values for ebolavirus with values within the range of −5 through 5.

Figures 4H, 4I:
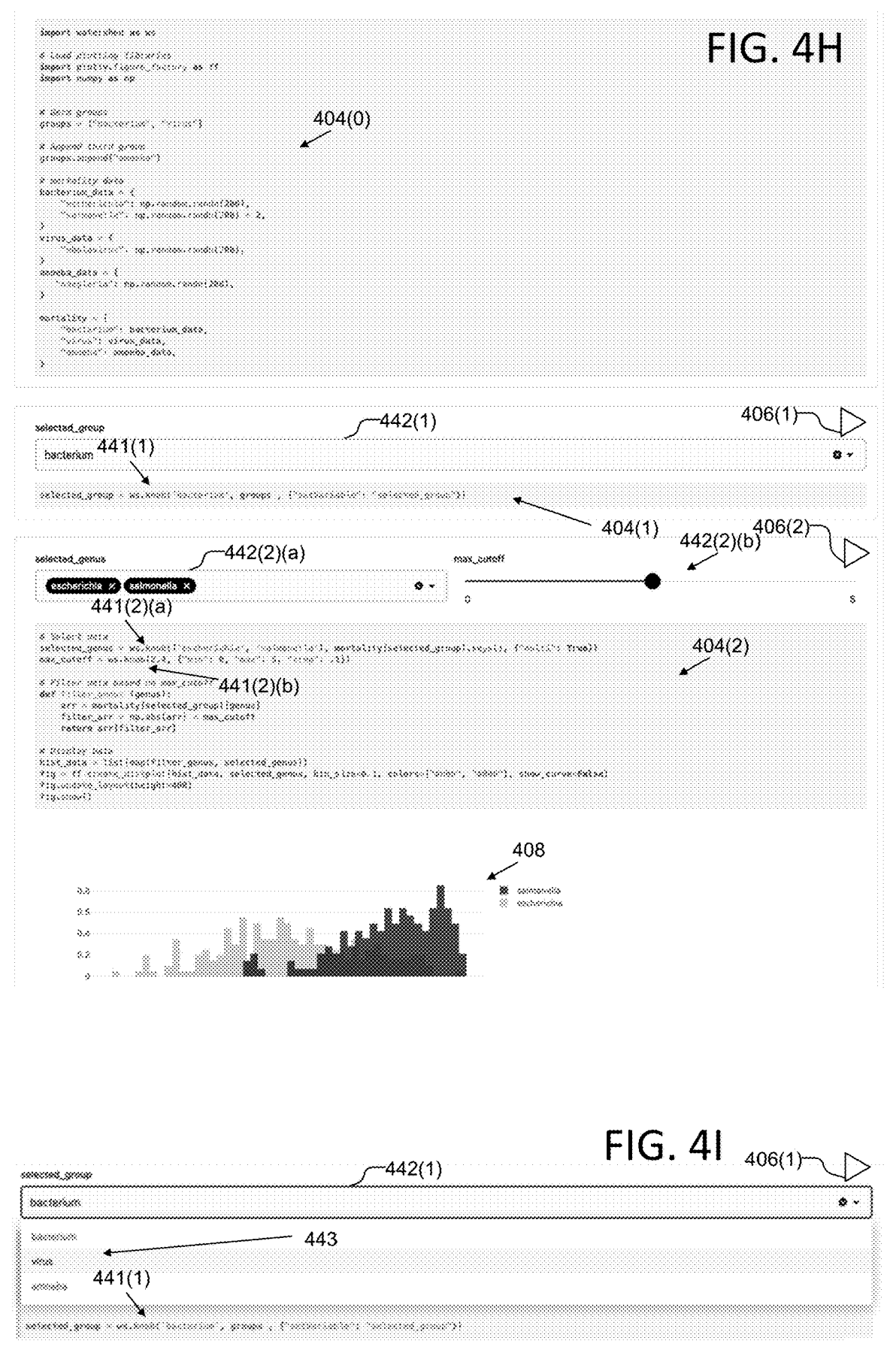

FIG. 4H is similar to FIG. 4E, but the user 210 has selected the "bacterium" option rather than the "virus" option in knob 442(1). Since the user 210 has selected "bacterium" in knob 442(1), the choices presented in dropdown menu 442(2)(a) are "*escherichia*" and "*salmonella*," both of which the user 210 has selected. When the user 210 selects execution element 406(2), code chunk 404(2) (as modified by the user's selections from knobs 442(2)) executes to generate output graph 408 (displayed aligned with and after code chunk 404(2). In the example of FIG. 4F, output graph 408 depicts binned mortality values for both *escherichia* and *salmonella* with values within the range of −2.4 through 2.4.

FIG. 4I illustrates an example of knob 442(1) while expanded after the user 210 has selected it. As depicted in FIG. 4I, expanded knob 442(1) displays list 443 having options "bacterium," "virus," and "amoeba." After the user 210 selects "bacterium," knob entry point 441(1) is updated to note that selection. It should be understood that in the examples of FIGS. 4A-4I, there may be additional source code (not depicted) beyond the source code 404 that is shown. This additional source code, which may be triggered once the user 210 is satisfied with the choices selected using the knobs 402, 412, 422, 432, 442 may utilize the values of variables defined by those knobs 402, 412, 422, 432, 442 to make further calculations. In an example, the additional source code may calculate and display an output value of a function based on the selections. In another example, the additional source code may calculate and display a graph based on the selections (e.g., output graph 408). In some embodiments, the user 210 selects an additional code execution element (not depicted) in order to execute the additional source code after executing the code execution element 406 to execute the displayed source code 404.

E. Computer Systems; Networking; Cloud Computing

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 5:
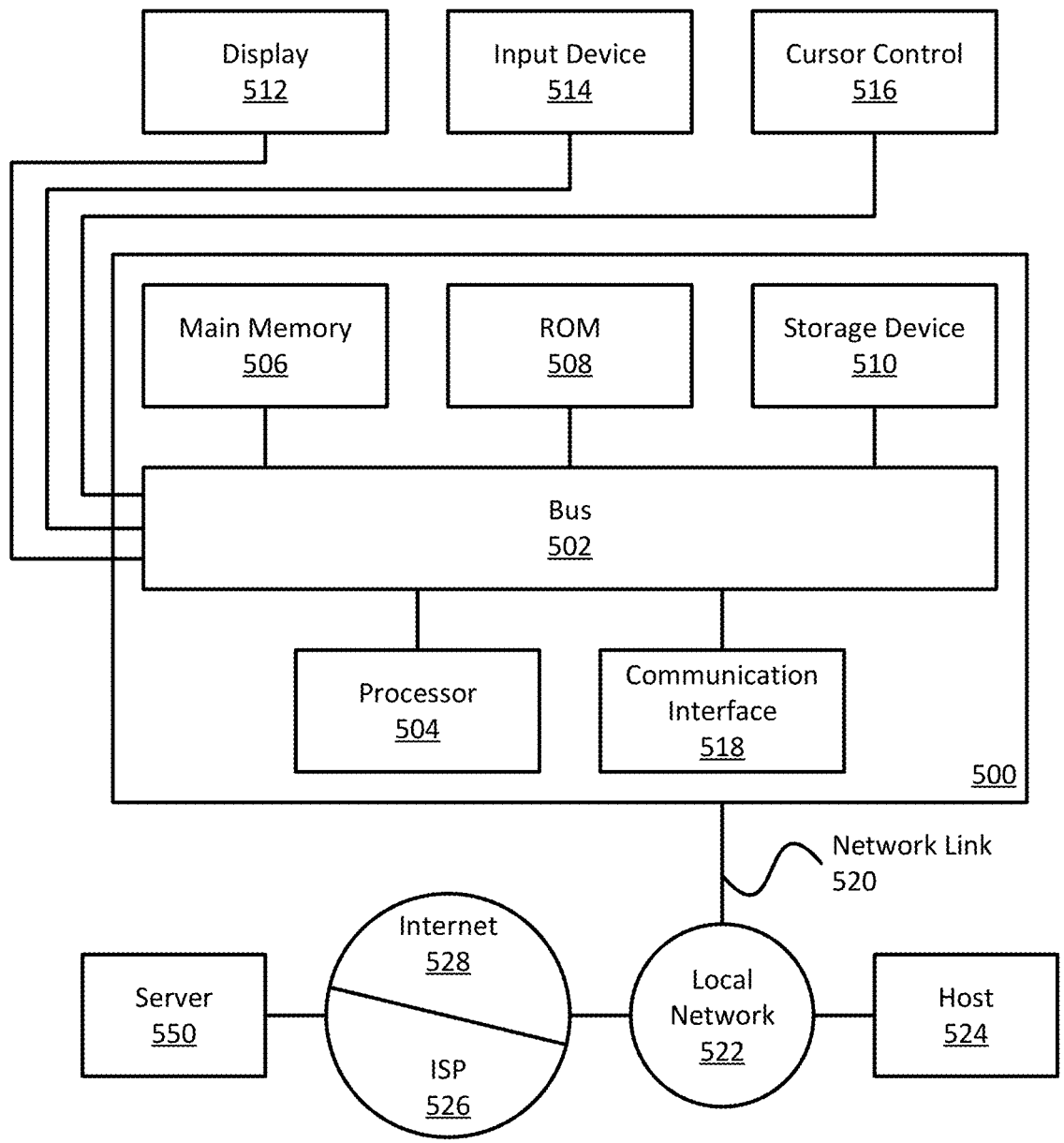
FIG. 5 is a block diagram of an example of a computer system according to an embodiment.

For example, FIG. 5 is a block diagram of an example of a computer system 500 according to an embodiment. Computer system 500 includes a bus 502 or other communication mechanism for communicating information, and a hardware processor 504 coupled with the bus 502 for processing information. Hardware processor 504 may be a general-purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in one or more non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), plasma display, electronic ink display, cathode ray tube (CRT) monitor, or any other kind of device for displaying information to a computer user 210. An input device 514, including alphanumeric and other keys, may be coupled to bus 502 for communicating information and command selections to processor 504. Alternatively or additionally, computer system 500 may receive user input via a cursor control 516, such as a mouse, a trackball, a trackpad, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Alternatively or additionally, computer system 5 may include a touchscreen. Display 512 may be configured to receive user input via one or more pressure-sensitive sensors, multi-touch sensors, and/or gesture sensors. Alternatively or additionally, computer system 500 may receive user input via a microphone, video camera, and/or some other kind of user input device (not shown).

Computer system 500 may implement the techniques described herein using customized hard-wired logic, one or more ASICs or FPGAs, firmware, and/or program logic which in combination with other components of computer system 500 causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 502. Transmission media may also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 500 may receive the data from the network and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522, and communication interface 518.

The received code may be executed by processor 504 as it is received, and/or stored in storage device 510, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

F. Method

Figure 6:
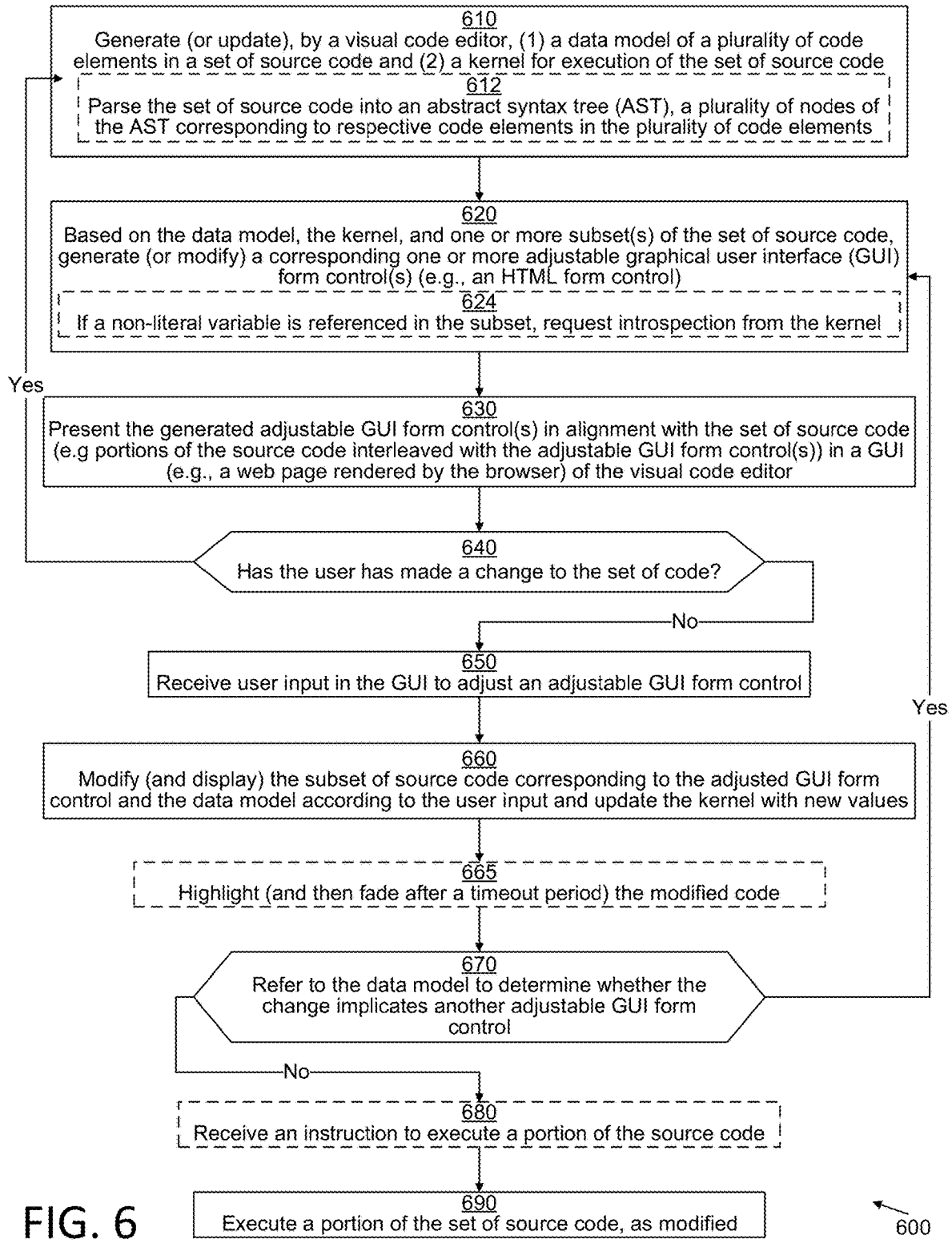
FIG. 6 illustrates an example method according to various embodiments.

FIG. 6 illustrates an example method 600 performed by a system 100 for facilitating software development by non-programmers. It should be understood that any time a piece of software (e.g., user interface 102, control generator 106, adjustable GUI form controls 116, web server 120, compiler, kernel 112, UI/Editor 212, etc.) is described as performing a method, process, step, or function, what is meant is that a computing device (e.g., computer system 500) on which that piece of software is running performs the method, process, step, or function when executing that piece of software on its processing circuitry (e.g., processor 504). It should be understood that one or more of the steps or sub-steps of method 600 may be omitted in some embodiments. Similarly, in some embodiments, one or more steps or sub-steps may be combined together or performed in a different order. Dashed lines indicate that a step or sub-step is either optional or representative of alternate embodiments or use cases.

In step 610, a visual code editor (e.g., UI/editor 212) generates (1) a data model of a plurality of code elements in a set of source code 110 and (2) a kernel 112 for execution of the set of source code 110. See above in connection with steps 221-223. In one example embodiment, step 610 includes sub-step 612, in which the visual code editor parses the set of source code 110 into an AST, a plurality of nodes of the AST corresponding to respective code elements in the plurality of code elements. In some embodiments, the visual code editor first extracts knob entry points 441 from the source code 110 and only parses code within the extracted knob entry points 441 into the AST.

In some embodiments, step 610 is performed by a web server 120, and in other embodiments, step 610 is performed by a web browser 104. In some embodiments, kernel 112 runs remotely from the visual code editor, with the visual code editor running on the user device, and the kernel 112 running on a remote server.

In step 620, based on the data model, the kernel 112, and one or more subset(s) of the set of source code 110, control generator 106 generates (or modifies) a corresponding one or more adjustable GUI form control(s) 116 (e.g., an HTML form control). Each adjustable GUI form control may be a knob (e.g., 402, 412(a), 412(b), 422, 432(a), 432(b), 442(1), 442(2)(a), 442(2)(b)). See above in connection with step 224. For example, in some embodiments, each knob entry point 441 is a subset of the set of source code 110 that directly corresponds to a knob 442. Referring back to FIG. 4E, knob entry point 441(2)(b) is defined by the following line of code:

max_cutoff=ws.knob(2.4,{"min":0,"max":5,"step": 1})

by matching a regular expression "*=ws.knob(*)" and the string "2.4, {"min": 0, "max": 5, "step": 1}" is extracted to refer to in creating knob 442(2)(b).

In one example embodiment, the control generator 106 is executed within web browser 104. In the event that an adjustable GUI form control is defined using literals (e.g., knob 402 is defined as displaying a literally-defined list: 'hg19', 'hg38', 'mm10', and 'sacCer'), reference is made to the data model (e.g., the AST). In the event that the adjustable GUI form control 116 is defined with reference to a variable (e.g., knob 442(2)(a) is defined as displaying a list defined by applying the "mortality" dictionary to the variable list "selected_group"), in sub-step 624 a request for variable introspection is made to the kernel 112 so that the kernel 112 retrieves the current value of that variable from memory and returns it to the control generator 106.

In step 630, system 100 presents the generated adjustable GUI form control 116 (or knob) in alignment with the set of source code 110 in a GUI 102 (e.g., a web page rendered by the browser 104) of the visual code editor. See above in connection with step 225. As an example, in the example of FIG. 4A, knob 402 is displayed in alignment with code chunk 404 (i.e., knob 402 is both left-aligned and right-aligned with the code chunk 404), and the knob 402 and code chunk 404 are displayed vertically-adjacent to each other. As another example, in the example of FIG. 4B, knobs 412(a), 412(b) are displayed in alignment with code chunk 404 (i.e., knob 412(a) is left-aligned with the code chunk 404, and knob 412(b) is right-aligned with the code chunk 404), with knobs 412(a), 412(b) displayed vertically-adjacent to code chunk 404. In some embodiments, in addition to being displayed in alignment, several adjustable GUI form controls 116 are displayed interleaved with the source code 110 (and output). For example, as depicted in FIG. 4E, code chunk 404(E) is displayed above knob 442(1), which is displayed above and vertically-adjacent to code chunk 404(1), which is displayed above knobs 442(2)(a), 442(2)(b), which are displayed above and vertically-adjacent to code chunk 404(2), which is displayed above output graph 408, which is an interleaved representation. In another embodiment, instead of knobs 442 being displayed above their corresponding code chunks 404, knobs 442 may be displayed below or horizontally next to (i.e., left or right of) their corresponding code chunks.

It should be understood that the display generated in step 630 may be done at a notebook level. Thus, even if GUI is too small to display the entirety of the generated display of FIG. 4E, for example, it may be generated within a window that the user 210 is able to scroll through.

In step 640, control generator 106 detects whether a user 210 has made a change to the set of source code 110 adjustable GUI form control. In response to an affirmative determination, operation returns back to step 610 so that the data model and kernel 112 can be updated (and the corresponding adjustable GUI form controls 116 can be modified (step 620) and re-presented (step 630)). Thus, control generator 106 may adjust one or more adjustable GUI form controls 116 according to the change in the set of code 110. For example, with reference to FIG. 4A, if the user 210 edits the sixth non-empty line of source code 404 to remove the text ", 'sacCer'" from the list in the definition of human_genome, then the dropdown list of knob 402 would change from including 4 elements (i.e., hg19, hg38, mm10, and sacCer) to instead include only 3 elements (i.e., hg19, hg38, and mm10). If the user 210 instead edits the sixth non-empty line of source code 404 to add the text ", 'GRCh37'" to the list in the definition of human_genome, then the dropdown list of knob 402 would change from including 4 elements (i.e., hg19, hg38, mm10, and sacCer) to instead include 5 elements (i.e., hg19, hg38, and mm10, sacCer, and GRCh37). See above in connection with steps 241-248. In response to a negative determination from step 640, in step 650, browser 104 receives user input from user 210 in the GUI to adjust an adjustable GUI form control 116 (see above in connection with step 261), and, in response, in step 660, the visual code editor modifies the subset of source code 110 (also displaying the modified code) corresponding to the adjusted GUI form control 116 according to the user input and updates the kernel 112 accordingly (see above in connection with steps 262-264). The corresponding subset of the source code 110 may be, for example, the knob entry point 441 that corresponds to the knob 442 that was adjusted. For example, with reference to FIG. 4D, if the user 210 slides the slider of knob 432(a) from an initial value of 0.19 to a new value of 0.57, then the second line of the source code 404 would be adjusted to read:

mito_percent=ws.knob(0.57,{'min':0,'max':1,'step': 0.01})

As another example, with reference to FIG. 4D, if the user 210 adjusts the slider of knob 432(b) from initial endpoints of 200 and 4000 to new endpoints of 300 and 5000, then the second line of the source code 404 would be adjusted to read:

> min_gene,max_gene=ws.knob([300,5000],{'min':0, 'max':6000,'step':100,'label':'Minimum and Maximum Genes per Cell'})

Figure 7:
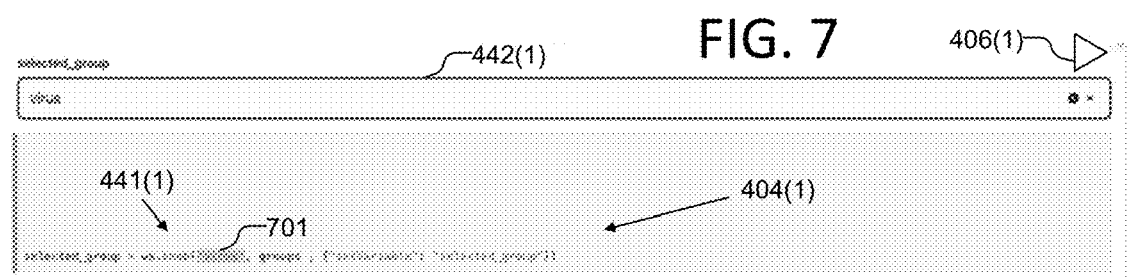
FIG. 7 illustrates an example highlighting/accentuation feature according to various embodiments.

In some embodiments, step 665 may be performed, in which the text that is modified within the knob entry point 441 is highlighted or otherwise accentuated (e.g., the text is colored, the background of the text is colored, the text is underlined, the text style is changed to bold, italic, another font, etc.), as depicted by the highlighting/accentuation 701 in FIG. 7. In some embodiments, this highlighting or accentuation is temporary, fading back to normal after a timeout period (e.g., 10 second, 30 seconds, 1 minute, 5 minutes, etc.).

In some embodiments, in step 670, visual code editor refers to the data model to determine whether the change that was just made implicates another adjustable GUI form control 116. For example, in FIGS. 4E-4I, when user 210 adjusts knob 442(1), the values displayed within knob 442(a)(1) are affected as well. Thus, in response to an affirmative determination, operation returns back to step 620 so that the other implicated adjustable GUI form control(s) 116 can be modified (step 620) and re-presented (step 630).

Afterwards, operation may proceed, in some embodiments, with step 680, in which user 210 selects a code execution element 406, directing the browser 104 to execute the source code 404, as modified in the previous steps. In some embodiments, step 685 may be omitted, and operation may continue straight with step 690, in which the browser 104 actually executes the source code 404, as modified in the previous steps. It is also possible for additional source code to be executed at this point, the additional source code referencing variables that were defined in the modified source code 404.

In some cases, executing source code 404 within step 690 may include displaying output, such as, for example, output graph 408 directly below the relevant source code 404, as depicted in FIG. 4E.

In some embodiments, visual code editor may generate a serialized object comprising a state of the adjustable GUI form controls 116 during a first session of the visual code editor. That is, the visual code editor may "save" the modified source code 404. Later, visual code editor may restore the state of the adjustable GUI form controls 116 in a second session of the visual code editor based on the serialized object (e.g., by loading the saved source code 404 at a later time).

G. Conclusion

While various embodiments of the invention have been particularly shown and described, it will be understood by those skilled in the art that various changes in form and details may be made therein without departing from the spirit and scope of the invention as defined by the appended claims.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "background" or as "conventional," Applicant makes no admission that such technique, method, apparatus, or other concept is actually prior art under 35 U.S.C. § 102 or 103, such determination being a legal determination that depends upon many factors, not all of which are known to Applicant at this time.

What is claimed is:

1. One or more non-transitory computer-readable media storing instructions that, when executed by one or more processors, cause the one or more processors to perform operations comprising:
    generating, by a visual code editor, (1) a data model of a plurality of code elements in a set of source code and (2) a kernel for execution of the set of source code;
    based on a subset of the set of source code, the data model, and the kernel, generating an adjustable graphical user interface (GUI) form control;
    presenting the adjustable GUI form control in alignment with the set of source code in a GUI of the visual code editor, including displaying the adjustable GUI form control vertically adjacent to the subset of the source code, the adjustable GUI form control being left-aligned with the subset of the source code; and
    responsive to user input in the GUI to adjust the adjustable GUI form control:
        modifying the subset of source code and the data model according to the user input;
        updating the presentation of the set of source code in the GUI to reflect the modified subset of source code; and
        executing the modified set of source code, thereby updating variable values within the kernel.

2. The one or more non-transitory computer-readable media of claim 1, wherein generating the data model of the plurality of code elements comprises:
    parsing the set of source code into an abstract syntax tree (AST), a plurality of nodes of the AST corresponding to respective code elements in the plurality of code elements.

3. The one or more non-transitory computer-readable media of claim 2, wherein:
    the GUI comprises a web page,
    the adjustable GUI form control is a hypertext markup language (HTML) form control, and
    generating the adjustable GUI form control is performed by an application running within a browser configured to render the webpage.

4. The one or more non-transitory computer-readable media of claim 1, the operations further comprising:
    while presenting the adjustable GUI form control in the GUI of the visual code editor, detecting a change in the subset of source code; and
    adjusting the adjustable GUI form control according to the change in the subset of source code.

5. The one or more non-transitory computer-readable media of claim 1, the operations further comprising:

based on another subset of the set of source code, the data model, and the kernel, generating another adjustable GUI form control, including:
  requesting variable introspection from the kernel with reference to the data model; and
  in response to obtaining updated variable values from the kernel, updating the data model and using the updated variable values in the other adjustable GUI form control;
presenting the other adjustable GUI form control in alignment with the set of source code in the GUI of the visual code editor; and
responsive to additional user input in the GUI to adjust the other adjustable GUI form control:
  modifying the other subset of source code and the data model according to the additional user input;
  updating the presentation of the set of source code in the GUI to reflect the modified other subset of source code; and
  executing the modified set of source code, thereby updating variable values within the kernel.

6. The one or more non-transitory computer-readable media of claim 5, wherein:
the operations further comprise, responsive to the user input in the GUI to adjust the adjustable GUI form control, setting a flag indicating that the data model has been updated; and
requesting variable introspection from the kernel as part of generating the other adjustable GUI form control is performed in response to detecting that the flag indicates that the data model has been updated.

7. The one or more non-transitory computer-readable media of claim 5, wherein presenting the adjustable GUI form control and the other adjustable GUI form control in alignment with the set of source code in the GUI of the visual code editor includes displaying the adjustable GUI form control and the other adjustable GUI form control interleaved with the set of source code in the GUI, the adjustable GUI form control being displayed with the subset of the source code and the other adjustable GUI form control being displayed with the other subset of the source code.

8. The one or more non-transitory computer-readable media of claim 1, wherein generating the adjustable GUI form control includes:
requesting variable introspection from the kernel with reference to the data model; and
in response to obtaining updated variable values from the kernel, updating the data model and using the updated variable values in the adjustable GUI form control.

9. The one or more non-transitory computer-readable media of claim 1, wherein presenting the adjustable GUI form control in alignment with the set of source code in the GUI of the visual code editor includes displaying the adjustable GUI form control and another adjustable GUI form control interleaved with the set of source code in the GUI, the adjustable GUI form control being displayed with the subset of the source code and the other adjustable GUI form control being displayed with another subset of the source code.

10. The one or more non-transitory computer-readable media of claim 1, wherein presenting the adjustable GUI form control in alignment with the set of source code in the GUI of the visual code editor includes displaying the adjustable GUI form control and another adjustable GUI form control horizontally adjacent to each other in the GUI, the adjustable GUI form control and the other adjustable GUI form control both being displayed vertically adjacent to the subset of the source code.

11. The one or more non-transitory computer-readable media of claim 1, wherein updating the presentation of the set of source code in the GUI to reflect the modified subset of source code includes displaying the subset of source code in the GUI with the modifications highlighted.

12. The one or more non-transitory computer-readable media of claim 11, wherein updating the presentation of the set of source code in the GUI to reflect the modified subset of source code further includes fading out the highlighting a predetermined amount of time after displaying the subset of source code in the GUI with the modifications highlighted.

13. The one or more non-transitory computer-readable media of claim 1 wherein executing the modified set of source code is performed in response to selection of a code execution element in the GUI.

14. The one or more non-transitory computer-readable media of claim 1, wherein the adjustable GUI form control is a slider control configured to allow the user to select a value of a numerical variable within the subset of the source code between a minimum and a maximum by sliding a control element along the slider control.

15. The one or more non-transitory computer-readable media of claim 1, wherein the adjustable GUI form control is a dropdown list control is configured to allow the user to select a value of a text variable within the subset of the source code by selecting a text string from a list of text strings displayed within the dropdown list control.

16. A system comprising:
at least one device including a hardware processor;
the system being configured to perform operations comprising:
  generating, by a visual code editor, (1) a data model of a plurality of code elements in a set of source code and (2) a kernel for execution of the set of source code;
  based on a subset of the set of source code, the data model, and the kernel, generating an adjustable graphical user interface (GUI) form control;
  presenting the adjustable GUI form control in alignment with the set of source code in a GUI of the visual code editor, including displaying the adjustable GUI form control vertically adjacent to the subset of the source code, the adjustable GUI form control being left-aligned with the subset of the source code; and
  responsive to user input in the GUI to adjust the adjustable GUI form control:
    modifying the subset of source code and the data model according to the user input;
    updating the presentation of the set of source code in the GUI to reflect the modified subset of source code; and
    executing the modified set of source code, thereby updating variable values within the kernel.

17. A method comprising:
generating, by a visual code editor, (1) a data model of a plurality of code elements in a set of source code and (2) a kernel for execution of the set of source code;
based on a subset of the set of source code, the data model, and the kernel, generating an adjustable graphical user interface (GUI) form control;
presenting the adjustable GUI form control in alignment with the set of source code in a GUI of the visual code editor, including displaying the adjustable GUI form control vertically adjacent to the subset of the source code, the adjustable GUI form control being left-aligned with the subset of the source code; and responsive to user input in the GUI to adjust the adjustable GUI form control:
  modifying the subset of source code and the data model according to the user input;
  updating the presentation of the set of source code in the GUI to reflect the modified subset of source code; and
  executing the modified set of source code, thereby updating variable values within the kernel.

18. The method of claim 17, wherein generating the adjustable GUI form control includes:
  requesting variable introspection from the kernel with reference to the data model; and
  in response to obtaining updated variable values from the kernel, updating the data model and using the updated variable values in the adjustable GUI form control.

19. The method of claim 17, wherein presenting the adjustable GUI form control in alignment with the set of source code in the GUI of the visual code editor includes displaying the adjustable GUI form control and another adjustable GUI form control interleaved with the set of source code in the GUI, the adjustable GUI form control being displayed with the subset of the source code and the other adjustable GUI form control being displayed with another subset of the source code.

20. The method of claim 17, wherein presenting the adjustable GUI form control in alignment with the set of source code in the GUI of the visual code editor includes displaying the adjustable GUI form control and another adjustable GUI form control horizontally adjacent to each other in the GUI, the adjustable GUI form control and the other adjustable GUI form control both being displayed vertically adjacent to the subset of the source code.

21. The method of claim 17, wherein updating the presentation of the set of source code in the GUI to reflect the modified subset of source code includes displaying the subset of source code in the GUI with the modifications highlighted.

* * * * *